(12) United States Patent
Hsiung

(10) Patent No.: US 7,175,276 B1
(45) Date of Patent: Feb. 13, 2007

(54) QUICK-COUPLED AND ADJUSTABLE TEMPLE FOR GLASSES

(75) Inventor: Yung Hsien Hsiung, Taipei (TW)

(73) Assignee: Doris Industrial Co., Ltd., Taipei (TW)

( * ) Notice: Subject to any disclaimer, the term of this patent is extended or adjusted under 35 U.S.C. 154(b) by 0 days.

(21) Appl. No.: 11/346,330

(22) Filed: Feb. 3, 2006

(30) Foreign Application Priority Data

Aug. 4, 2005 (TW) ............................. 94213340 U

(51) Int. Cl.
*G02C 5/14* (2006.01)
(52) U.S. Cl. ...................... 351/120; 351/121; 351/153
(58) Field of Classification Search ........ 351/111–121, 351/153; 16/228
See application file for complete search history.

(56) References Cited

U.S. PATENT DOCUMENTS 5,511,251 A * 4/1996 Brakas ........................... 2/452

6,364,479 B1 * 4/2002 Wu ............................. 351/120

\* cited by examiner

*Primary Examiner*—Huy Mai
(74) *Attorney, Agent, or Firm*—Troxell Law Office, PLLC

(57) ABSTRACT

A quick-coupled and adjustable temple for glasses includes a coupler defining a forward opened receiving cavity and having two short shafts vertically projected from an upper and a lower front end of the coupler for engaging with two shaft holes correspondingly provided at a lateral outer end of an adjacent rim of the glasses; and a temple being provided closely behind an inner front or proximal end with a centered coupling member for engaging with the receiving cavity on the coupler, and at the inner front end with a sideward projection. The temple is connected to the rim via the coupler by sliding the coupling member into the receiving cavity of the coupler to tightly fit therein. The temple could be vertically pivotally turned about the engaged coupling member and receiving cavity to different angular positions relative to the rim to meet a wearer's preference or head configuration.

5 Claims, 6 Drawing Sheets

QUICK-COUPLED AND ADJUSTABLE TEMPLE FOR GLASSES

FIELD OF THE INVENTION

The present invention relates to a temple for glasses, and more particularly to a quick-coupled temple that could be vertically pivotally turned to different angular positions relative to the rims of glasses, so that the glasses could be more comfortably worn on a user's head.

BACKGROUND OF THE INVENTION

People suffering myopia, astigmatism, or presbyopia need to wear suitable glasses to adjust their vision. The currently available glasses are designed based on ergonomics to minimize the wearer's discomfort due to wearing the glasses over a prolonged time. For this purpose, the temples of the glasses are usually bendable or finely adjustable.

A pair of glasses typically includes two lenses set in two rims connected to each other via a bridge, and two temples separately connected at front ends to two lateral outer ends of the rims by means of hinges and screws, such that the temples could be folded at the hinges toward the bridge to locate behind the rims and lenses for easy carrying and storage of the glasses when the same is not in use. An angle contained between the temple and the adjacent rim tends to increase when the glasses has been used for a long time, particularly when the wearer has a wide face. The adjustment of the angle contained between the temple and the rim is uneasy and troublesome and must be done by an artisan using suitable devices. In the case of plastic rims and temples, the artisan has to heat and thereby soften the temples, so that the temples could be finely adjusted according to the wearer's head configuration to allow comfortable wearing of the glasses. In the case of metal rims and temples, they must be adjusted using special tools to avoid spoiling the finish and appearance thereof.

There are glasses with integrally formed rims and temples made of a special metal with memory, such as titanium alloys or magnesium alloys. Such rims and temples may be readily adjusted or bent according to the wearer's head or preference but require high manufacturing cost, which is not affordable by general consumers. Moreover, some users have an allergic reaction to the special metal material with memory. Therefore, the conventional metal and plastic temples are not easily adjustable for the wearers to wear the glasses comfortably, and have the problems of expensive price and/or forming an allergen to some wearers.

SUMMARY OF THE INVENTION

A primary object of the present invention is to provide a quick-coupled and adjustable temple for glasses that could be quickly and conveniently connected to a rim of the glasses via a coupler without using any tool and metal parts.

Another object of the present invention is to provide a quick-coupled and adjustable temple for glasses that could be vertically pivotally turned about a coupler to locate at different angular positions relative to a rim of the glasses for a user to wear the glasses more comfortably.

To achieve the above and other objects, the quick-coupled and adjustable temple for glasses according to the present invention includes a coupler defining a forward opened receiving cavity and having two short shafts vertically projected from an upper and a lower front end of the coupler for engaging with two shaft holes correspondingly provided at a lateral outer end of an adjacent rim; and a temple being provided closely behind an inner front or proximal end with a centered coupling member for engaging with the receiving cavity on the coupler, and at the inner front end with a sideward projection.

In a preferred embodiment of the present invention, the coupling member on the temple is in the form of a circular cup.

The projection provided at the inner front end of the temple is adapted to abut on a stopper provided at a lateral front end of the rim to prevent the temple from being overly pivotally turned about the short shafts of the coupler to forward locate beyond the rim.

To connect the temple to the rim of the glasses, first engage the two short shafts on the coupler with the two shaft holes on the rim, so that the coupler is connected to the rim. Then, slide the coupling member into the forward opened receiving cavity to connect the temple to the coupler and accordingly the rim. The temple could be vertically pivotally turned about the coupling member in the receiving cavity to different angular positions relative to the rim to meet a wearer's preference or head configuration.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
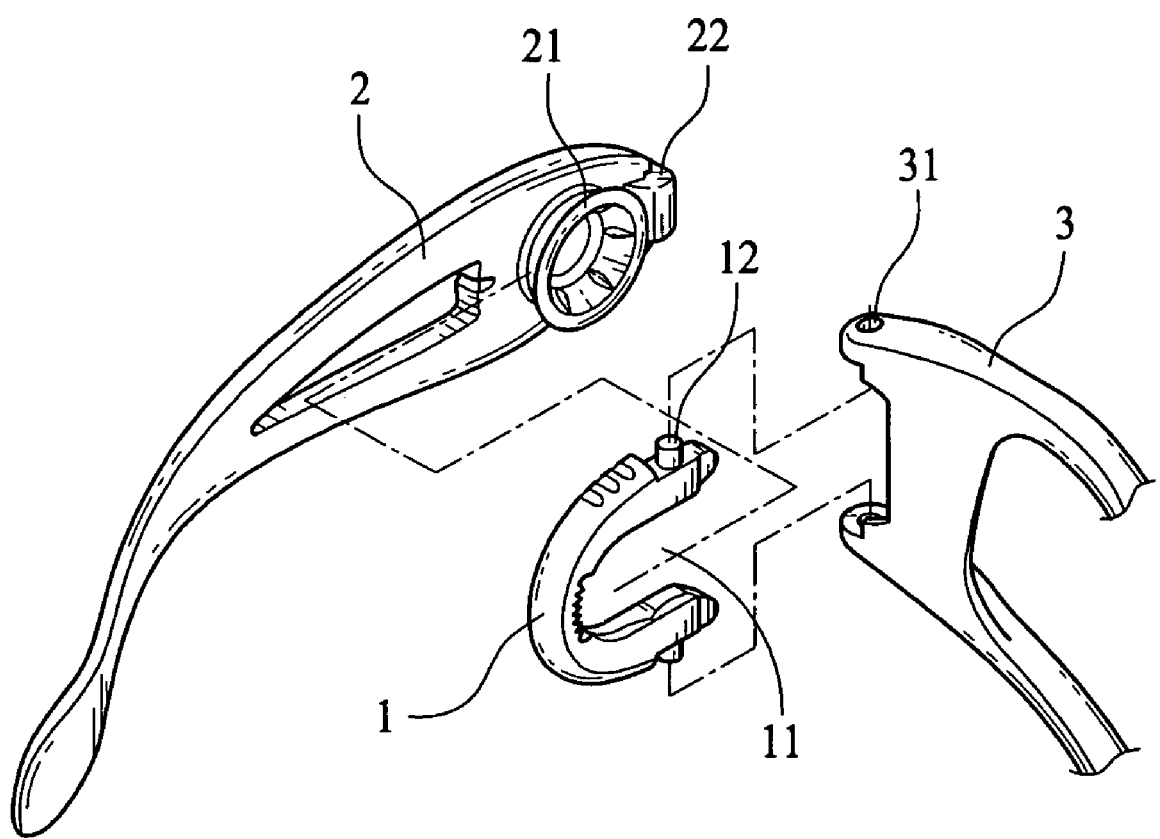
FIG. 1 is an exploded perspective view of a quick-coupled and adjustable temple for glasses according to the present invention.

Please refer to FIGS. 1 to 4, in which a quick-coupled and adjustable temple for glasses according to a preferred embodiment of the present invention is shown.

The quick-coupled and adjustable temple for glasses of the present invention includes a coupler 1 and a temple 2. The coupler 1 defines a forward opened receiving cavity 11 and has two short shafts 12 separately vertically projected from an upper front end and a lower front end thereof. The temple 2 is provided closely behind an inner front or proximal end with a centered coupling member 21 for engaging with the receiving cavity 11 on the coupler 1, and at the inner front end with a sideward projection 22.

The short shafts 12 on the coupler 1 are provided for engaging with two shaft holes 31 correspondingly provided at a lateral outer end of a rim 3 of the glasses, so as to connect the coupler 1 to the rim 3.

In the preferred embodiment of the present invention, the coupling member 21 on the temple 2 is substantially a circular cup.

The projection 22 on the temple 2 is provided for abutting on a stopper 32 provided at a lateral front end of the rim 3 adjacent to the temple 2 (see FIG. 4), so as to prevent the temple 2 from being overly turned from a folded position to forward locate beyond the rim 3.

Figure 2:
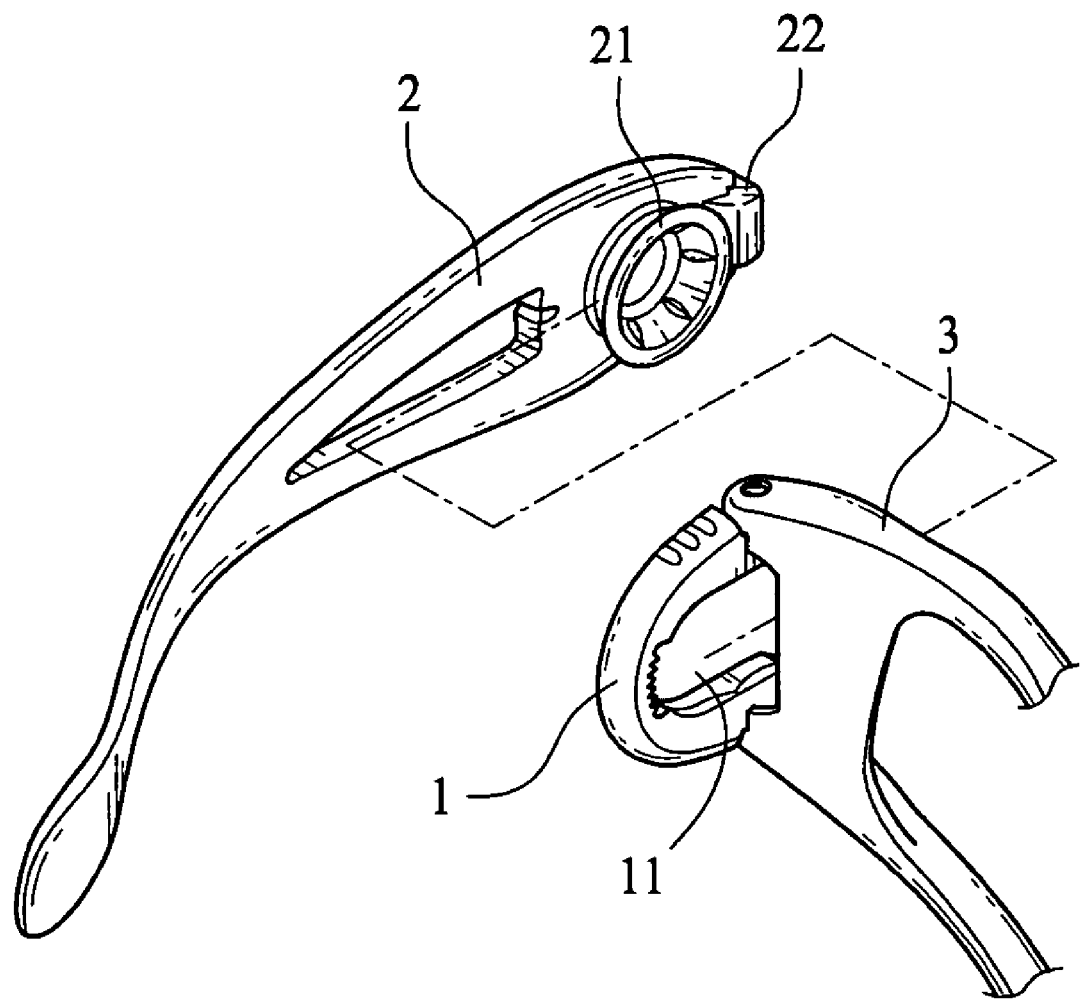
FIG. 2 shows the connection of a coupler for the temple of the present invention to a rim of the glasses.

To connect the temple 2 to the rim 3, first engage the two short shafts 12 on the coupler 1 with the two shaft holes 31 on the rim 3, so that the coupler 1 is pivotally connected to the rim 3 with an angle of 90 degrees temporarily contained between them. At this point, the open end of the receiving cavity 11 defined by the coupler 1 is directed forward to locate at the lateral outer end of the rim 3, as shown in FIG. 2. Then, move the temple 2 toward the coupler 1 and slide the coupling member 21 in the form of a circular cup fully into the receiving cavity 11 of the coupler 1 via the forward open end of the receiving cavity 11, so that the temple 2 is connected to the coupler 1 and accordingly the rim 3.

Since the circular cup-shaped coupling member 21 has a size slightly larger than that of the receiving cavity 11, the coupling member 21 is located in the receiving cavity 11 in a tight fit manner without the risk of easily separating therefrom.

Since the temple 2 is quickly connected to the rim 3 via the coupler 1 without using any tool and metal parts, such as screws, the glasses using the temples 2 of the present invention can be more quickly and conveniently manufactured or assembled to reduce the manufacturing cost thereof. Moreover, since no metal parts are needed to connect the temple 2 to the rim 3, it is possible to avoid the potential danger existed in the conventional temple that might injure a user due to any metal part when the conventional temple is broken at the joint with the rim. Therefore, the glasses using the temples 2 of the present invention is safer for wearing.

Figure 5:
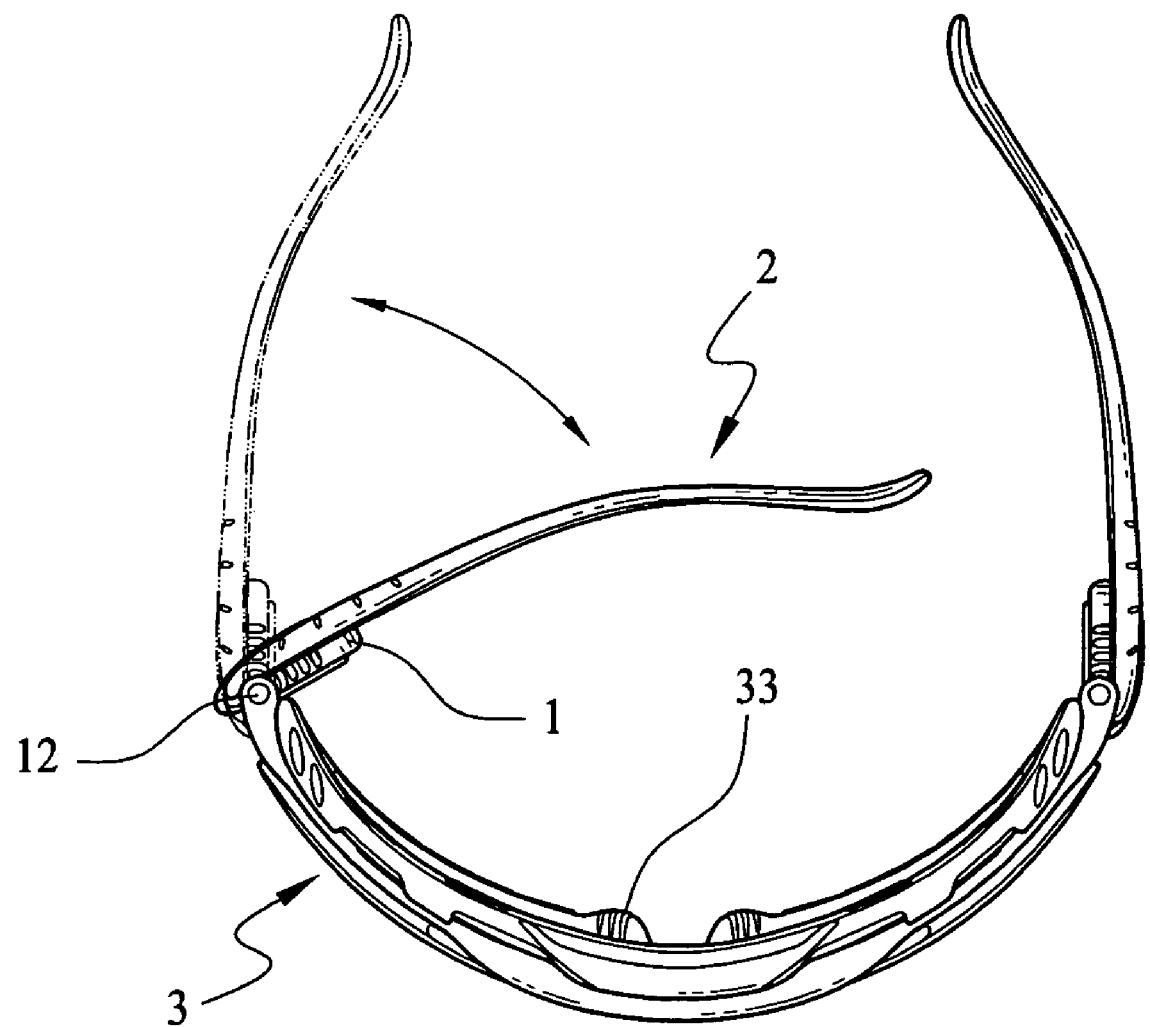
FIG. 5 shows the folding of the temple of the present invention toward a bridge of the glasses.

Please refer to FIG. 5. When it is desired to fold the temples 2 for easy carrying of the glasses when the same is not in use, simply turn every temple 2 about the short shafts 12 that are engaged with the shaft holes 31 on the rim 3, and the temple 2 connected to the coupler 1 via the engaged coupling member 21 and receiving cavity 11 is moved along with the coupler 1 toward a bridge 33 of the glasses into a folded position.

Figure 4:
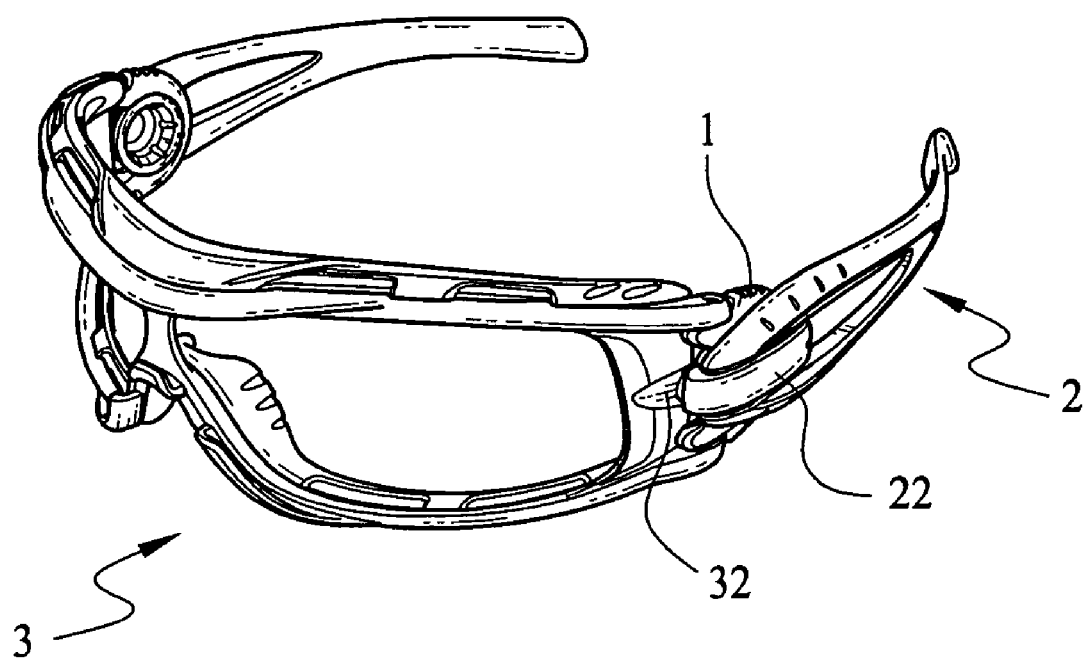
FIG. 4 is a perspective view of a pair of glasses with the temples of the present invention.

Please refer to FIGS. 4 and 5 at the same time. When a user wants to wear the glasses and extends the temples 2 from the folded position, the projection 22 provided at the front inner end of every temple 2 would finally press against the stopper 32 provided at the lateral front end of the adjacent rim 3, preventing the temple 2 from being overly turned outward to become damaged, deformed or even broken due to improper operation thereof or unexpected external force applied thereto.

Figure 3:
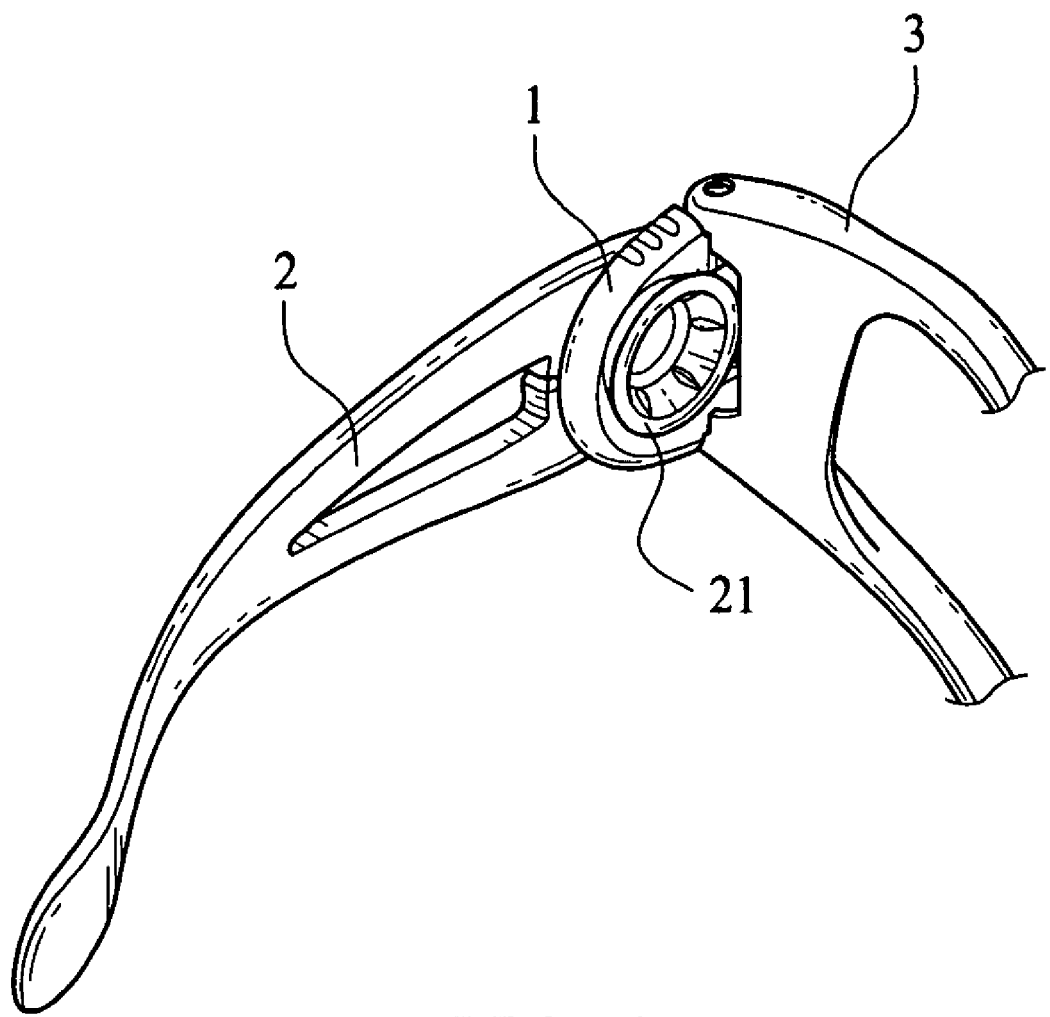
FIG. 3 shows the temple of the present invention having been fully connected to the rim via the coupler.
Figure 6:
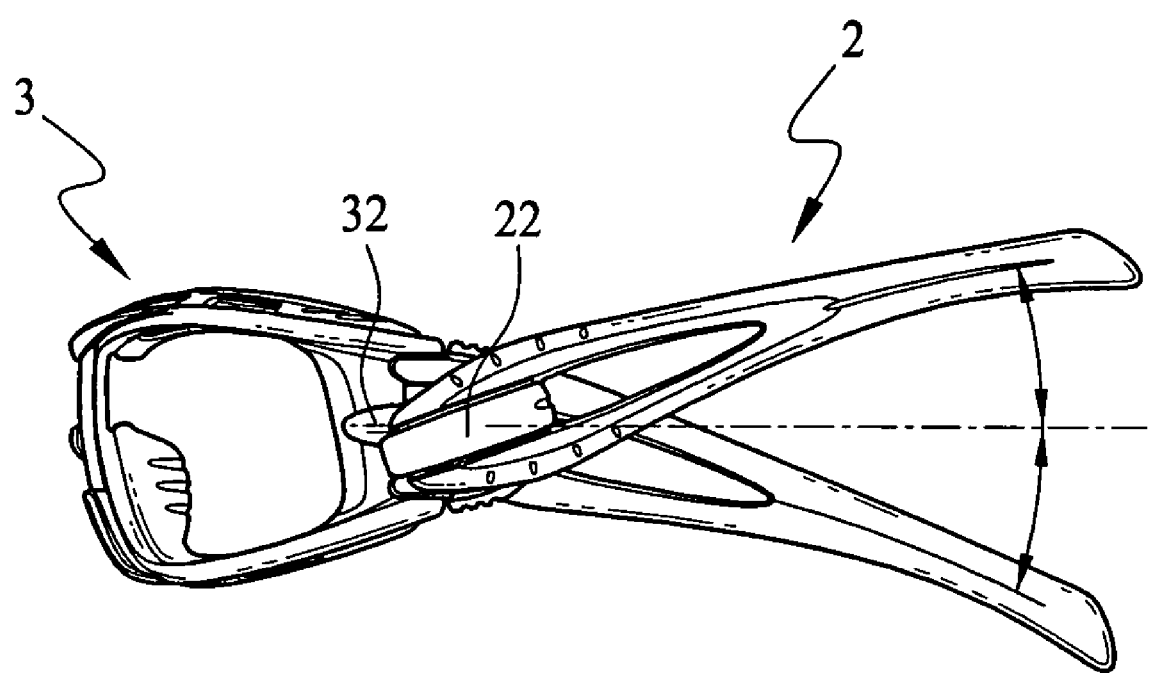
FIG. 6 shows the manner of vertically turning the temple of the present invention to different angular positions relative to the rim of the glasses.

Please refer to FIGS. 3 and 6. Since the coupling member 21 is in the form of a circular cup, it is possible for the circular coupling member 21 to rotate in the receiving cavity 11. In this manner, the temple 2 could be vertically pivotally turned about the mutually engaged circular coupling member 21 and receiving cavity 11 within a range about +/−10 degrees to locate at different angular positions relative to the rim 3. Therefore, a wearer may vertically adjust the angular position of the temple 2 relative to the rim 3 in accordance with the wearer's preference or head configuration, so as to wear the glasses comfortably. In brief, the temple 2 according to the present invention has at least the following advantages:

1. The temple 2 could be quickly and conveniently connected to the rim 3 via the coupler 1 simply by sliding the coupling member 21 into the receiving cavity 11 without using any tool and metal parts.
2. The temple 2 could be vertically pivotally turned about the circular coupling member 21 and thereby adjusted to different angular positions relative to the rim 3 depending on the wearer's need.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A quick-coupled and adjustable temple for glasses, comprising:
   a coupler defining a forward opened receiving cavity and having two short shafts separately vertically projected from an upper front end and a lower front end thereof for connecting to a rim of said glasses; and
   a temple being provided closely behind an inner front or proximal end with a centered coupling member for engaging with said receiving cavity on said coupler, and at the inner front end with a sideward projection.

2. The quick-coupled and adjustable temple for glasses as claimed in claim 1, wherein said coupling member on said temple is in the form of a circular cup.

3. The quick-coupled and adjustable temple for glasses as claimed in claim 1, wherein said projection provided at the inner front end of said temple is adapted to abut on a stopper provided at a lateral front end of said rim to prevent said temple from being overly pivotally turned about said short shafts of said coupler to forward locate beyond said rim.

4. The quick-coupled and adjustable temple for glasses as claimed in claim 1, wherein said short shafts provided on said coupler are adapted to engage with two shaft holes provided at a lateral outer end of said rim.

5. The quick-coupled and adjustable temple for glasses as claimed in claim 1, wherein said coupling member has a size slightly larger than that of said receiving cavity on said coupler.

* * * * *